July 5, 1938.  L. J. LUBINS  2,122,692
MOWING APPARATUS
Filed June 29, 1936  2 Sheets-Sheet 1
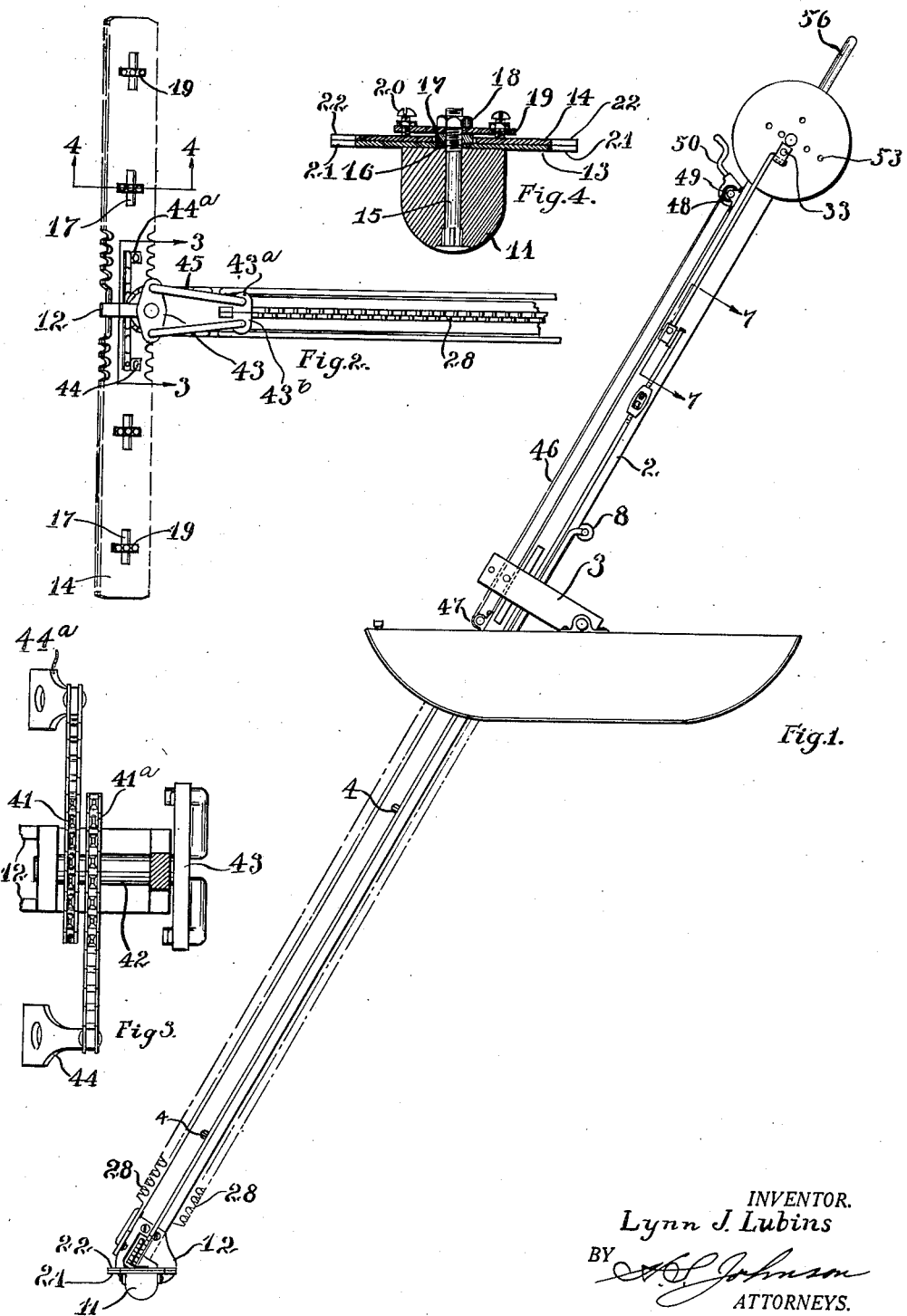
INVENTOR.
Lynn J. Lubins
BY
ATTORNEYS.

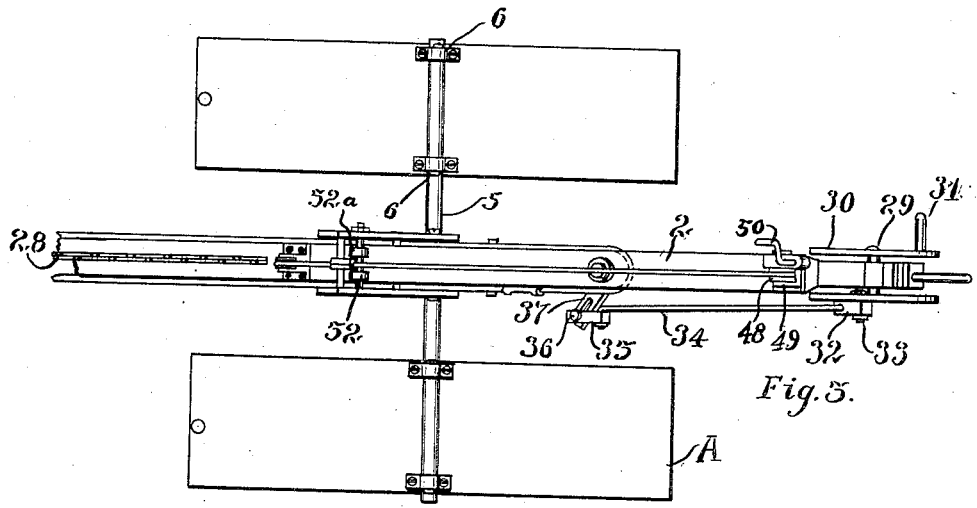
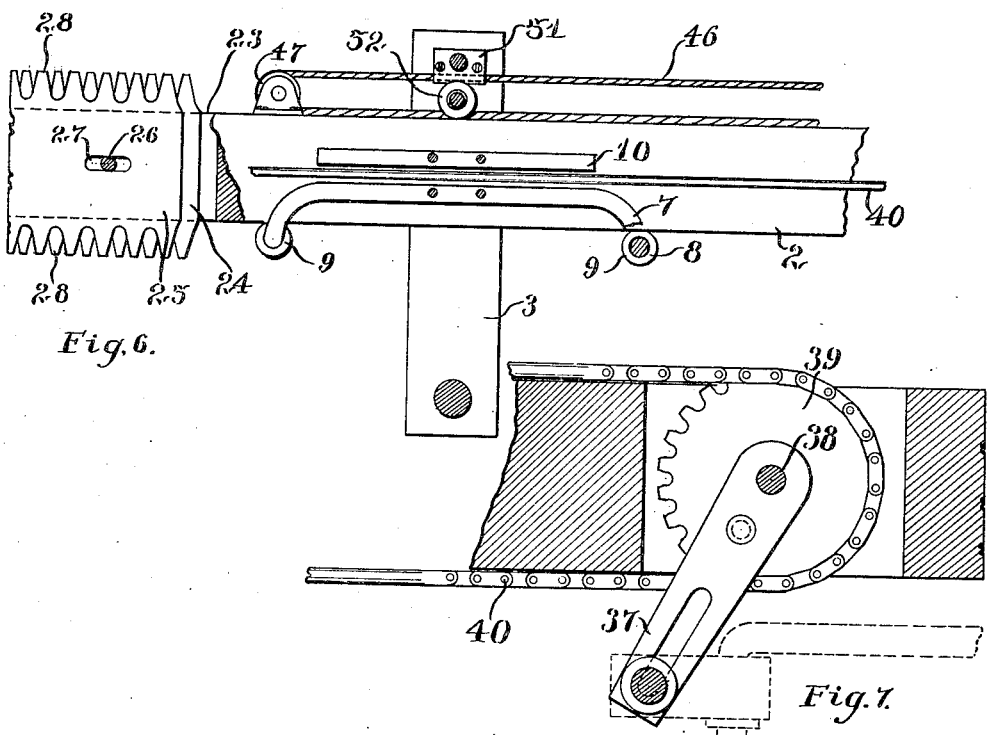

Patented July 5, 1938

2,122,692

UNITED STATES PATENT OFFICE 2,122,692

MOWING APPARATUS

Lynn J. Lubins, St. Paul, Minn.

Application June 29, 1936, Serial No. 87,901

6 Claims. (Cl. 56—8)

My invention relates to improvements in mowing apparatus, particularly designed for cutting off weeds under water.

One of the objects of my invention is to provide an apparatus that can be easily and effectively operated by one man; which will be particularly simple and light in construction, and which will effectively shear off the weeds at the desired water level from the surface of the water to the desired depth, and including means for cleaning the cutting knives in the cutting operation, etc.

These and other features of the invention will be more particularly set forth in the following description and the accompanying drawings, wherein:

Figure 1 is a view in side elevation of my improved machine, showing cutting position at approximate depth of six feet below the surface.

Figure 2 is a top view of the front or cutting end of the apparatus.

Figure 3 is a sectional view on line 3—3 of Figure 2.

Figure 4 is a sectional view on line 4—4 of Figure 2.

Figure 5 is a top view of the upper or above-water end of the apparatus.

Figure 6 is a view in side elevation, shown partly broken away, of the apparatus at the upper end of the cutting knives; and Figure 7 is a sectional view on line 7—7 of Figure 1.

Referring to the drawings in detail, A represents pontoons upon which the operating mechanism may be supported. The operating mechanism includes a beam 2 having slidable and pivotal support upon arms 3, said arms extending upwardly from and being supported at their lower ends upon a cross shaft 5. Said cross shaft is mounted in bearings 6 supported on top of the pontoons. As shown, particularly in Figure 6, the arms 3 support yokes 7. The downwardly projecting ends of the yokes upon the opposite bars are connected by rods 8 carrying rollers 9 upon which the beam rides. The arms 3 also support horizontal bars 10 spaced above the yokes and forming an intermediate channel for the operating rod or chain, as hereinafter pointed out.

Supported crosswise on the forward end of the beam is a bar 11, which bar forms a support for the lower cutting blades, as hereinafter set forth. The supporting means for the bar 11 consists of a clevis 12 secured upon the end of the beam 2, the arms of the clevis fitting over the cross beam and being secured thereto, as shown in Figure 1. The cross bar 11 forms a support for horizontally disposed blades 13 and 14 in the following manner:

Bolts 15 extend vertically through the cross bar 11 and extend through openings 16 in the blades 13 and through a square nut 17—a located in a longitudinal slot 17 in the superimposed blades 14. Mounted upon the bolts 15, above the blades and underneath the nuts 18, on the upper ends of the bolts, are cross pieces 19 carrying in their ends adjustable screws 20 for the purpose of applying adjustable pressure to the blades. The blades 13 and 14, as shown, are formed upon their opposite edges with teeth 21 and 22. In operation, the upper blade 14 is reciprocated upon the blade 13, as hereinafter set forth.

Supported in a vertical slot 23 in the forward end of the beam 2 are the vertically disposed blades 24 and 25. Horizontal pins 26 pass through horizontal slots 27 in both blades to form the slidable support for the blades. The blades 24 and 25 are formed on their upper and lower edges with corresponding teeth 28, adjusting screws 4 keeping proper tension on said blades.

For the purpose of actuating the cutting blades in operation of the machine, I employ the following mechanism: Having pivotal support 29 upon the upper end of the beam 2 is a disk 30 carrying on one side an eccentrically disposed handle 31 and upon the opposite side an opposed eccentrically disposed link 32 having pivotal support 33. The link 32 is connected by a rod 34 with a link 35 having slot and pin connection 36 with the lower end of an arm 37. The upper end of the arm 37 is secured upon the supporting shaft 38 of a sprocket wheel 39, intermeshing with a chain 40. The chain 40 extends longitudinally of the beam and at its forward ends extends oppositely around superimposed sprocket wheels 41 and 41—a mounted upon a vertical shaft 42. The ends of the chain pass in opposite directions from the sprocket wheels 41 and 41—a to brackets 44 and 44—a, secured to the movable blade 14. The shaft 42 supports a cross arm 43 connected at its ends by links 45 to the arms 43—a and 43—b, said arms being connected to the vertical blades to bring about a reciprocating action of said blades as the chain is actuated.

In order to hold the beam 2 in adjusted positions to regulate the depth of the projection of the outer end of the beam into the water, I provide a cable 46 extending at one end around a sheave 47 on the top of the beam, and at its other end around a pulley 48 pivotally mounted in a bracket 49 supported near the inner end of the beam 2.

An operating handle 50 is connected with the pulley 49 to turn the same. The cable intermediate of its ends is anchored by a bracket 51 upon the beam supporting arms 3.

52 and 52—a illustrate idler rollers carried by the arms 3 and engaging with the beam. As will be evident, by actuating the handle 50 to draw upon the cable in either direction, the beam will be caused to slide in a corresponding direction between the idler rollers 8, 9, and 52 and 52—a, to extend the cutter end of the beam into the water, or to withdraw the same and regulate the cutting position of the blades by the selected balance desired.

In operation, with the apparatus supported upon the water by the pontoons, the beam 2 will be turned by the operating handle 56 upon the supporting arms to the desired inclined position, as shown in Figure 1, and the beam 2 maintained in the properly adjusted position with reference to said arms, as above set forth. To hold the horizontal cutter blades in the desired cutting position, the pontoons may be secured behind a boat and the operator positioned in the boat will operate the mechanism through the actuating crank arms 31. The continued operation of the crank arm 31 will rotate the disk 30, and, by reason of the eccentric support of the actuating rod 34 on the side of the disk, will reciprocate said rod and chain 40 to bring about the horizontal sliding back and forth of the upper horizontal cutter blade 14 and the reciprocating sliding of the vertical blades 24 and 25. As will be apparent, the ends of the chain 40 by being connected with the movable blade 14 upon opposite sides of the sprocket wheels 41 and 41—a will in the reciprocation of the chain impart a reverse sliding movement to the blade 14. The extent of this movement may be regulated by the adjustability of the pivot 33 in connection with the openings 53 in the disk 30.

As will be apparent, the upper horizontal blade, as it is drawn through the weeds, will do the work of cutting off the weeds. The vertical reciprocating blades, standing in operation in front of the horizontal blades, co-operate in helping the cutting of a path in front of the horizontal blades to accommodate the front end of the beam projecting into the water, and also perform the function of keeping the supporting forward end of the beam freed of the weeds that have been cut by the horizontal blade. The vertical reciprocating blades are a very important feature of the invention in bringing about ease and cleanness of operation, enabling easy operation by one man power and in permitting the beam with its cutting blades to be easily held in adjusted positions and bring about a uniform cutting of the weeds at any depth to six feet.

By means of my different features of invention herein set forth, I secure an apparatus that is very easy to adjust and to handle in operation by a single operator, and that can be made light and simple in construction, and is particularly effective in performing a clean weed cutting operation.

I claim:

1. A weed cutting apparatus of the character described comprising in combination with a supporting float, pivotally supported arms carried by said float, a beam slidably supported intermediate its ends upon said arms, an operating element supported upon the rear end of said beam, a cable slidably connecting said element with said beam supporting arm and actuatable to longitudinally adjust said beam with respect to said arm, a horizontal cutting blade slidably supported at the forward end of said beam, vertical cutting blades slidably supported at the rear of said horizontal blade, a manually operative element supported at the rear end of said beam, and an operative connection between said element and said blades, for the purpose set forth.

2. A weed cutting apparatus of the character described, including a beam, a supporting member for said beam, means slidably and pivotally supporting said beam intermediate its ends upon said supporting member, horizontal and relatively slidable cutting blades supported by the forward end of said beam, longitudinally slidable vertical cutting blades disposed at the rear of said horizontal blades, an operating element supported by the rear end of said beam, an actuating connection between said element and said blades, a separate operating element supported upon the rear end of said beam, a cable connecting said operating element with said beam support and actuatable to adjust said beam longitudinally upon said support, for the purpose set forth.

3. A weed cutting apparatus of the character described, including a beam, a supporting member for said beam, means slidably and pivotally supporting said beam intermediate its ends upon said supporting member, horizontal and relatively slidable cutting blades supported by the forward end of said beam, longitudinally slidable vertical cutting blades disposed at the rear of said horizontal blades, an operating element supported by the rear end of said beam, an actuating connection between said element and said blades, a separate operating element supported upon the rear end of said beam, a cable connecting said operating element with said beam support and actuatable to adjust said beam longitudinally upon said support, and roller bearings for said beam carried by said beam support, for the purpose set forth.

4. In combination with a supporting unit, a weed cutting apparatus of the character described, a beam, means slidably and pivotally supporting said beam intermediate its ends upon said unit, a horizontally disposed cutting blade, means slidably supporting said blade upon the forward end of said beam, a pair of vertically disposed cutter blades slidably supported along said beam at the rear of said horizontal blade, and actuating means supported upon the inner end of said beam and operatively connected with said cutter blades to oppositely reciprocate said vertically disposed cutter blades and to reciprocate said horizontal blade, for the purpose set forth.

5. In combination with a supporting unit, a weed cutting apparatus of the character described, a beam, means pivotally and slidably supporting said beam intermediate its ends upon said unit, means for slidably adjusting said beam upon its support consisting of a manually actuatable part supported upon the inner end of said beam and an operable connection between said manually actuatable part and said beam supporting means, a horizontally disposed cutting blade supported upon the outer end of said beam, vertically disposed slidable cutter blades supported by said beam at the rear of said horizontal blade, and actuating means supported upon the inner end of said beam and operatively connected with said cutter blades to actuate the same, for the purpose set forth.

6. In combination with a supporting unit, a weed cutting mechanism of the character described comprising a beam, means pivotally supporting said beam intermediate its ends upon said unit, a slidable support for said beam upon said pivotal supporting means, adjusting mechanism for said beam comprising adjustable connection between the beam and its pivotal supporting means, actuatable means for regulating said adjustable connection, cutter blades slidably supported upon said beam, and actuating means for said cutter blades supported in connection with the inner end of said beam.

LYNN J. LUBINS.